United States Patent
Yokota et al.

[11] Patent Number: 5,862,174
[45] Date of Patent: Jan. 19, 1999

[54] DATA STORAGE MEDIUM

[75] Inventors: Tsuneshi Yokota, Kawasaki; Tetsuo Saitoh, Yokohama, both of Japan

[73] Assignee: Kabushiki Kaisha Toshiba, Kawasaki, Japan

[21] Appl. No.: 570,967

[22] Filed: Dec. 12, 1995

[30] Foreign Application Priority Data

Dec. 13, 1994 [JP] Japan .................................. 6-309192

[51] Int. Cl.$^6$ .............................. H04B 1/38; H04L 5/16
[52] U.S. Cl. ....................... 375/219; 375/324; 235/492; 235/380
[58] Field of Search ...................... 375/219, 316, 375/322, 324, 341; 340/825.54; 235/492, 380, 493; 364/480, 550

[56] References Cited

U.S. PATENT DOCUMENTS 4,799,240  1/1989  Yoshida ................................ 375/355
4,837,556  6/1989  Matsushita et al. ................... 359/144

FOREIGN PATENT DOCUMENTS 3-296889  12/1991  Japan .

*Primary Examiner*—Don N. Vo
*Attorney, Agent, or Firm*—Pillsbury Madison & Sutro LLP

[57] ABSTRACT

A first full-wave rectifier circuit generates a power supply voltage from a received modulated radio wave signal and a second full-wave rectifier circuit binarizes the voltage to obtain a binary signal. A continuous clock signal is generated from the binary signal. The modulated radio wave signal is also binarized and demodulated using the continuous clock signal. This demodulation is performed simultaneously with the generation of the power supply voltage. A command can be received continuously and data can be read or written continuously. Therefore, the reception of power or the reception/transmission of data need not be performed intermittently, but rather a large amount of data can be received or transmitted continuously at high speed.

13 Claims, 12 Drawing Sheets

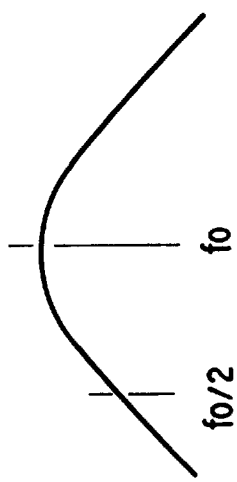
FIG. 9
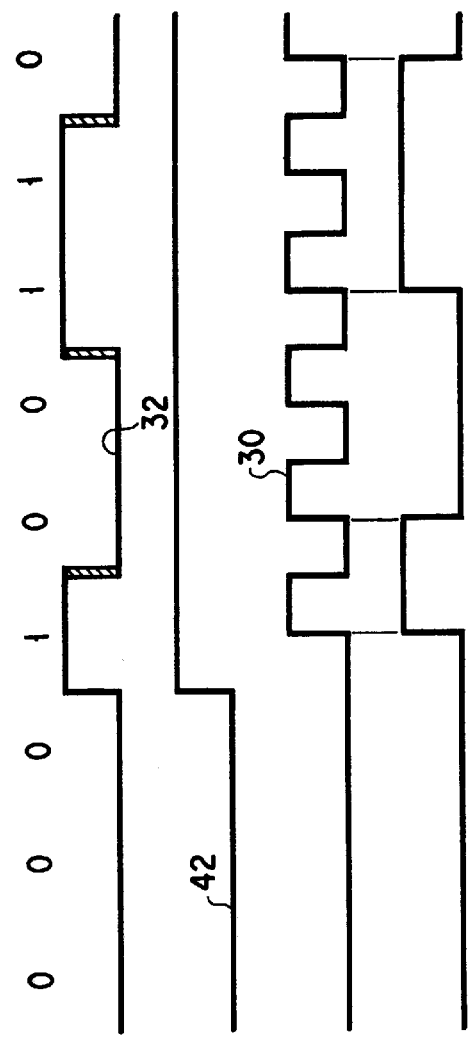
FIG. 12A  DATA BIT
FIG. 12B  DEMODULATED DATA
FIG. 12C  CLEAR SIGNAL OF FREQUENCY DIVIDER 14
FIG. 12D  Q3 OUTPUT OF COUNTER 117
FIG. 12E  SYNC DATA

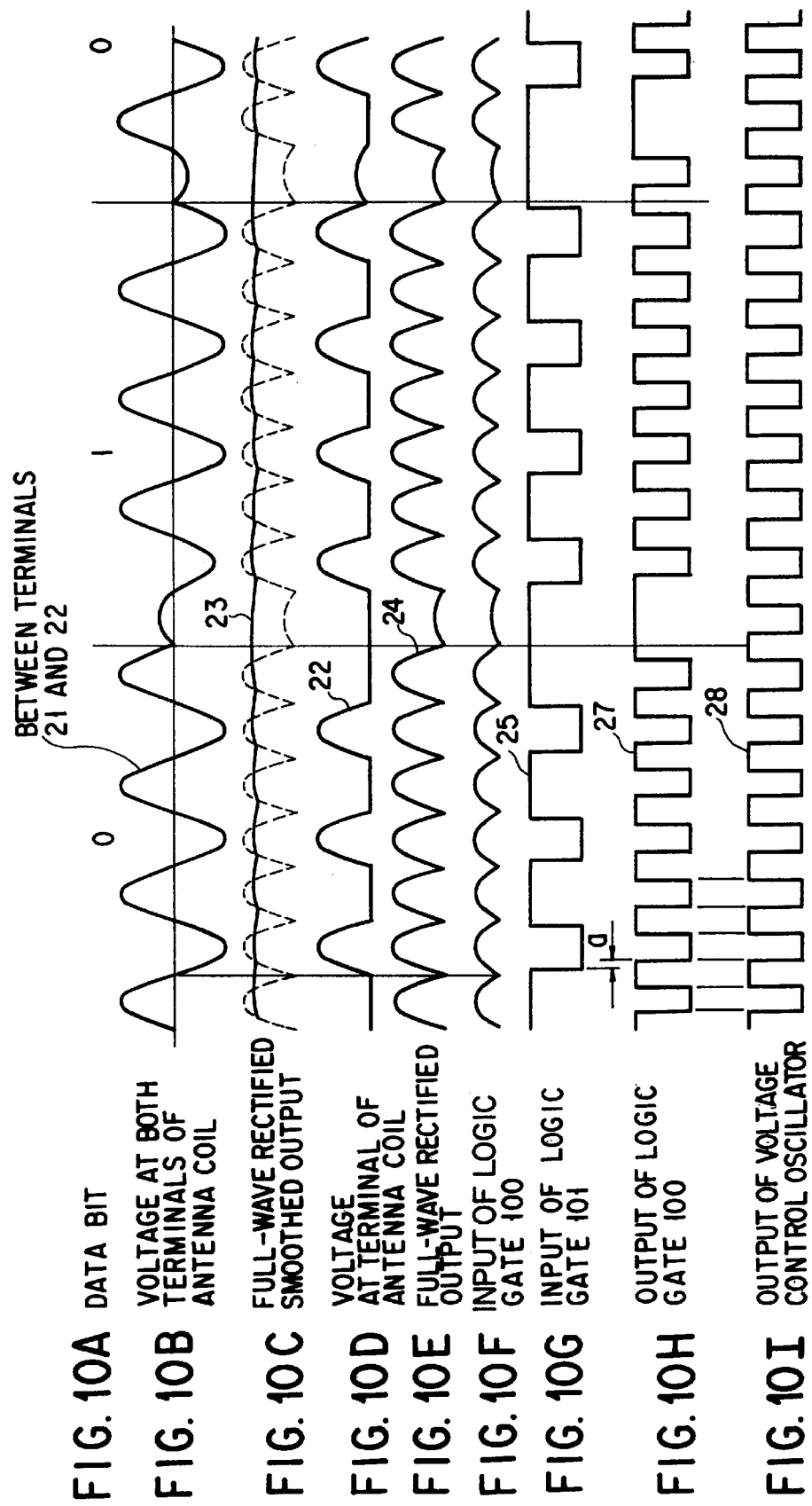

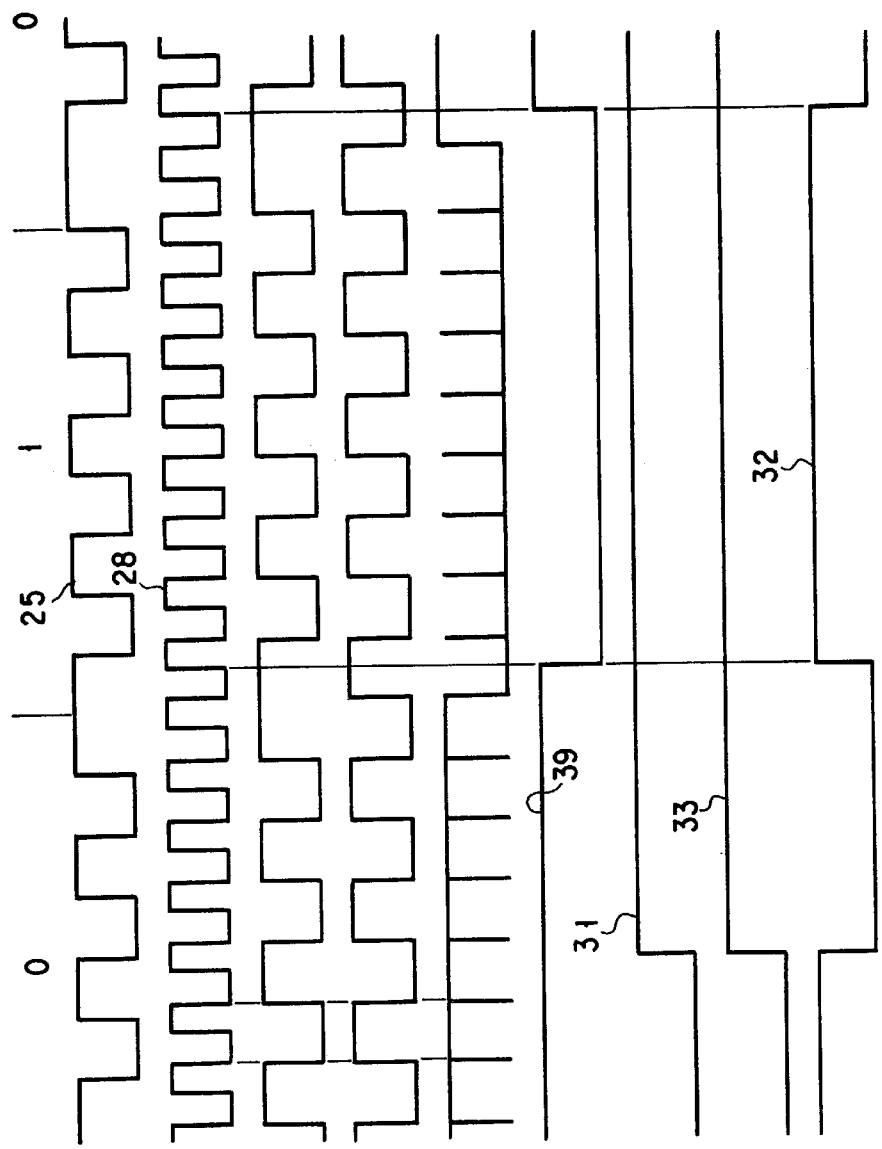

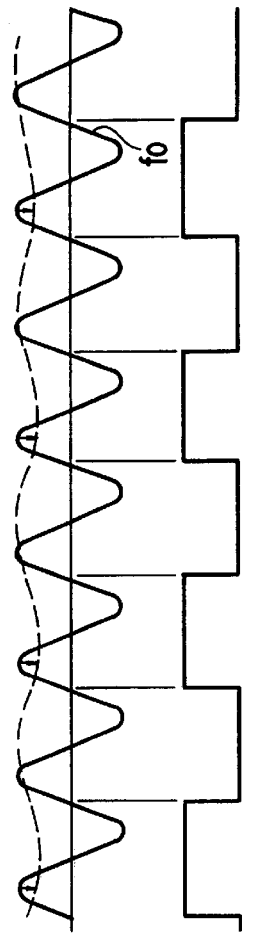
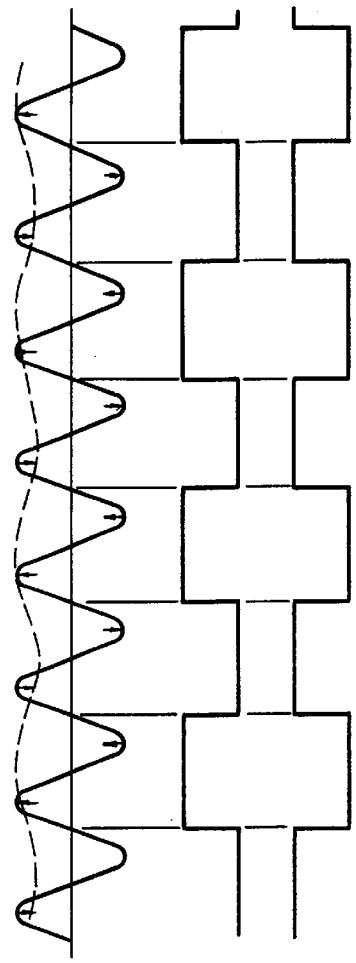
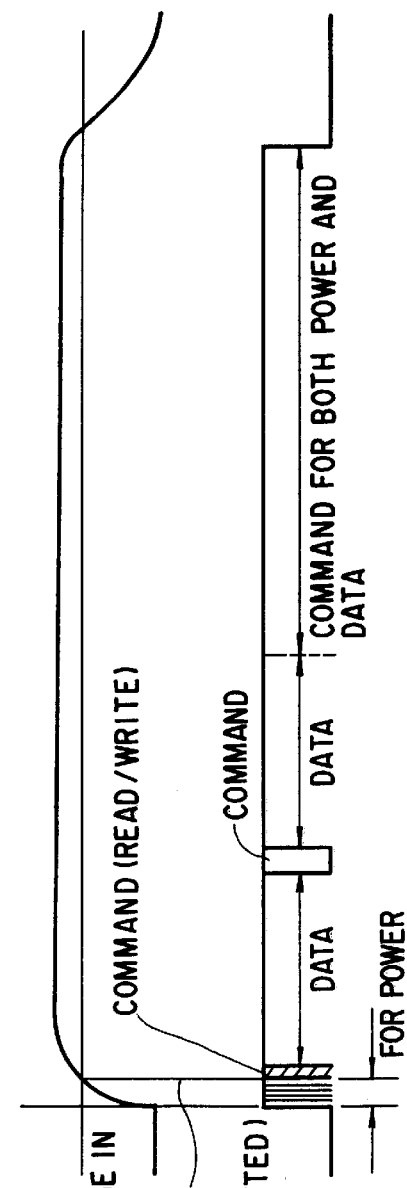
FIG. 13A ANTENNA RECEIVED VOLTAGE (SOLID LINE)/TRANSMITTED CURRENT (DOTTED LINE)
FIG. 13B OUTPUT OF DRIVER 105
FIG. 13C ANTENNA RECEIVED VOLTAGE (SOLID LINE)/TRANSMITTED CURRENT (DOTTED LINE)
FIG. 13D OUTPUT OF DRIVER 102
FIG. 13E OUTPUT OF DRIVER 103
FIG. 14A POWER SUPPLY VOLTAGE IN RADIO CARD
FIG. 14B RECEIVED (TRANSMITTED) CONTENTS OF RADIO CARD

DATA STORAGE MEDIUM

BACKGROUND OF THE INVENTION

1. Field of the Invention

The present invention relates to a data storage medium and, more particularly, to a portable data storage medium having a radio communication function.

2. Description of the Related Art

Radio cards and tags without any battery have recently been developed as portable data storage mediums having a radio communication function and have started to be put to practical use. These data storage mediums generally perform an intermittent operation of half duplex communications using ASK (amplitude-shift keying) modulation, and the amount of data which can be transmitted through one communication is small.

According to the conventional intermittent communication, a cycle of power reception, data reception and data transmission, for generating a power supply voltage in a radio card, is repeated every time a small amount of data of one bit is communicated. For example, the radio card is charged with a power carrier wave (for a predetermined period of time) to receive a command (indicative of reading or writing of data) or read/write data within a range of voltage used during the discharge. In other words, since a predetermined period of time for charging the radio card is always required before the reception of a command or the reading/writing of data, the reception or reading/writing cannot be performed continuously. Such intermittent communication causes a problem of making it difficult to continuously receive/transmit a large amount of data at high speed.

SUMMARY OF THE INVENTION

An object of the present invention is to provide a data storage medium, such as a radio card without any battery, which need not intermittently receive power, receive data, transmit data, or the like but can continuously receive or transmit a large amount of data at high speed.

In order to achieve the above object, according to one aspect of the present invention, there is provided a data storage medium including a reception means, a power supply voltage generation means, a clock signal generation means and a demodulation means.

The reception means receives a modulated radio wave signal having a predetermined frequency.

The power supply voltage generation means generates a power supply voltage from the modulated radio wave signal received by the reception means.

The clock signal generation means generates a continuous clock signal from the modulated radio wave signal received by the reception means.

The demodulation means demodulates the modulated radio wave signal received by the reception means, using the continuous clock signal generated by the clock signal generation means.

The modulated radio wave signal is demodulated simultaneously with generation of the power supply voltage by the power supply voltage generation means.

According to another aspect of the present invention, there is provided a data storage medium without a battery, comprising: a reception means, first and second full-wave rectifying means, a power supply voltage generation means, a first binarization means, a clock signal generation means, a second binarization means and a demodulation means.

The reception means receives a two-phase modulated radio wave signal.

The first and second full-wave rectifying means full-wave-rectifies the two-phase modulated radio wave signal received by the reception means.

The power supply voltage generation means generates a power supply voltage from an output voltage of the first full-wave rectifying means.

The first binarization means binarizes an output voltage of the second full-wave rectifying means.

The clock signal generation means generates a continuous clock signal in response to a binary signal output from the first binarization means.

The second binarization means binarizes the two-phase modulated radio wave signal received by the reception means.

The demodulation means demodulates a binary signal output from the second binarization means, using the continuous clock signal generated by the clock signal generation means.

In the above-described radio card having a communication function, which eliminates the drawback due to intermittent communication, a power supply voltage required in a data storage medium continues to be generated from a received two-phase modulated radio wave signal. Meanwhile, the demodulation of data and command or address, generation of clock signal, storage of data are continued concurrently with one another in response to the two-phase modulated radio wave signal, with the result that a large amount of data can be communicated at high speed. Furthermore, data can be continuously transmitted from the radio card.

The received two-phase modulated radio wave signal is binarized in response to a continuous clock signal generated by dividing and binarizing a full-wave rectified signal output from a full-wave rectifier. The binarization timing of the two-phase modulated radio wave signal can thus be delayed, and the received signal can be binarized at the time it is stabilized. This timing is always reliably maintained. Consequently, the received two-phase modulated radio wave signal can be correctly demodulated even if its intensity changes.

Since a current source in a transmitting driver absorbs electromotive force and is received by a loop-shaped antenna coil, using a predetermined amount of current necessary for data transmission, the transmission can be stabilized with fixed intensity even though a distance between the radio card and radio card reader/writer varies.

An EEPROM is generally used as a nonvolatile memory in the radio card. This memory necessitates a high voltage in the write mode and thus the current (power) consumption in the write mode is greater than that in the read mode. It is desirable to decrease the power consumption as much as possible since a power supply voltage required in the radio card is generated from the received radio wave signal. If, therefore, the current source of the transmitting driver is turned off in the write mode, the current consumption of the driver becomes zero and thus the power consumption can be reduced in the write mode.

According to the present invention, since a demodulation circuit for demodulating a two-phase modulated radio wave signal can be constituted of logic circuits, it can be decreased in size and a low-pass filter including resistors and capacitors is not needed. The demodulation circuit is therefore suitable for integration.

The radio card of the present invention is provided with a circuit with a simple arrangement for reliably specifying the absolute phase of a received two-phase modulated radio wave signal.

In the radio card of the present invention, a transmitted current is superimposed upon a received carrier wave reliably and efficiently by performing a push-pull operation for both ends of the loop-shaped antenna coil of a parallel tuning circuit. Since an output of a voltage driver for performing the push-pull operation is connected to the antenna coil through a resistor, the transmitted current can be controlled by the resistance value of the resistor and so can the selectivity characteristics of the parallel tuning circuit.

The parallel tuning circuit is tuned with the frequency of a received carrier wave, and a power supply voltage is efficiently generated from the carrier wave. Since the frequency of a transmitted carrier wave is 1/n (n=an integer) as high as that of the received carrier wave, no interference occurs between them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a view for explaining the relationship between carrier frequency f0 of two-phase modulated wave signal received by a parallel tuning circuit and carrier frequency f0/2 thereof transmitted from the parallel tuning circuit;

FIGS. 10A to 10I are views of signal waveforms of the principal part of the radio card;

FIGS. 11A to 11J are views of signal waveforms of the principal part of the radio card;

FIGS. 12A to 12E are views of signal waveforms of the principal part of the radio card;

FIGS. 13A to 13E are views of signal waveforms of the principal part of the radio card; and FIGS. 14A and 14B are timing charts for explaining the power supply voltage in the radio card and the contents of reception (transmission) of the radio card.

DETAILED DESCRIPTION OF THE PREFERRED EMBODIMENTS

An embodiment of the present invention will now be described with reference to the accompanying drawings.

Figure 1:
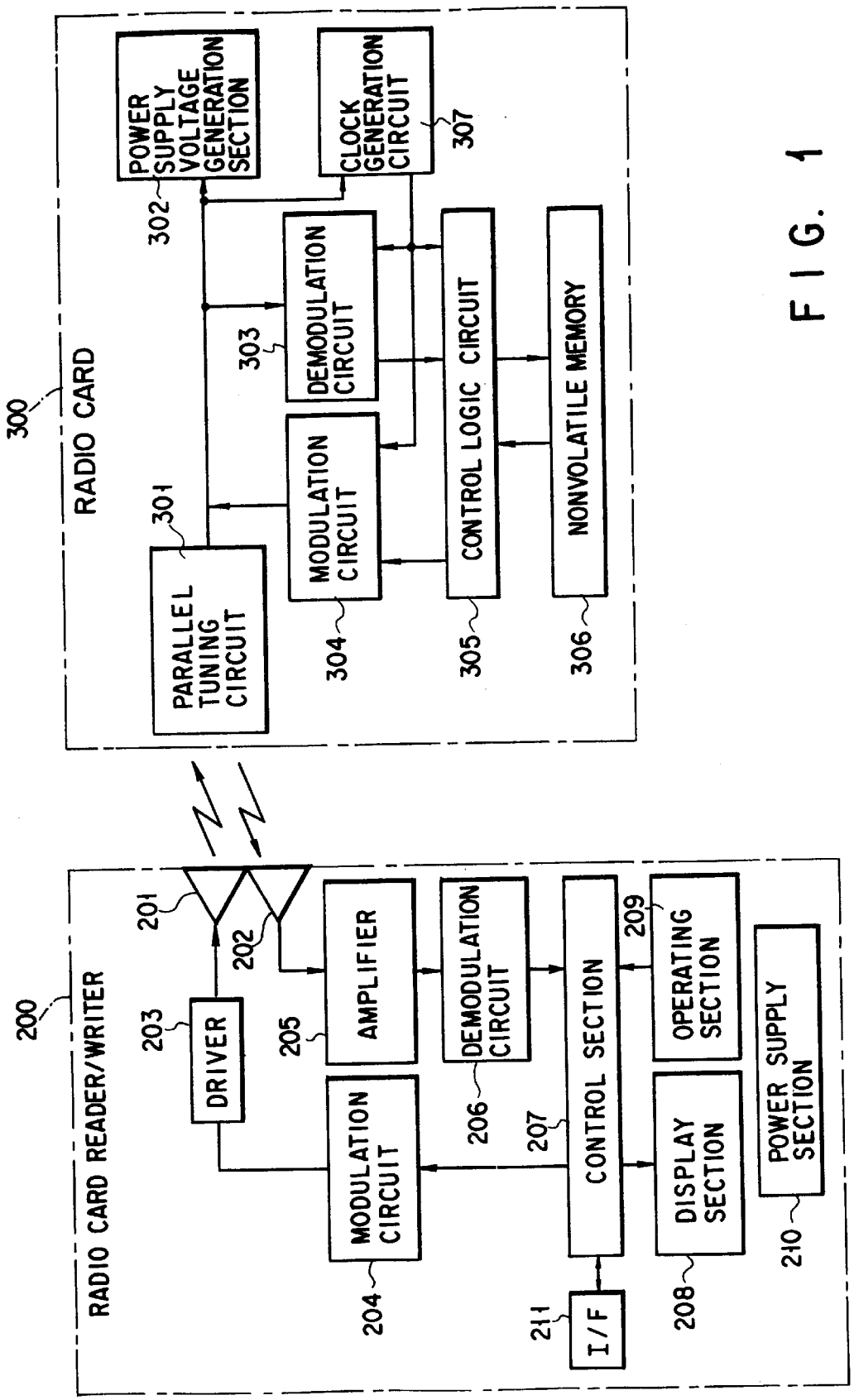
FIG. 1 is a block diagram schematically showing the constitution of a radio card system.

FIG. 1 shows the constitution of a radio card system using a radio card as a data storage medium.

As shown in FIG. 1, the radio card system is roughly divided into a radio card reader/writer 200 serving as a data processing apparatus and a radio card 300 serving as a portable data storage medium having a radio communication function.

The radio card reader/writer 200 is designed to read/write (store) data from/to the radio card 300, transmit a command, process readout data, transmit write data. The radio card reader/writer 200 includes a control section 207, a modulation circuit 204, a transmitting driver 203, a transmitting antenna 201, a receiving antenna 202, a receiving amplifier 205, a demodulation circuit 206, an operating section 209 such as a keyboard, a display section 208, a power supply 210 made of mainly a battery for applying an operating power supply voltage to each of the constituent elements, and an interface 211 connected to an external device (not shown).

Figure 2:
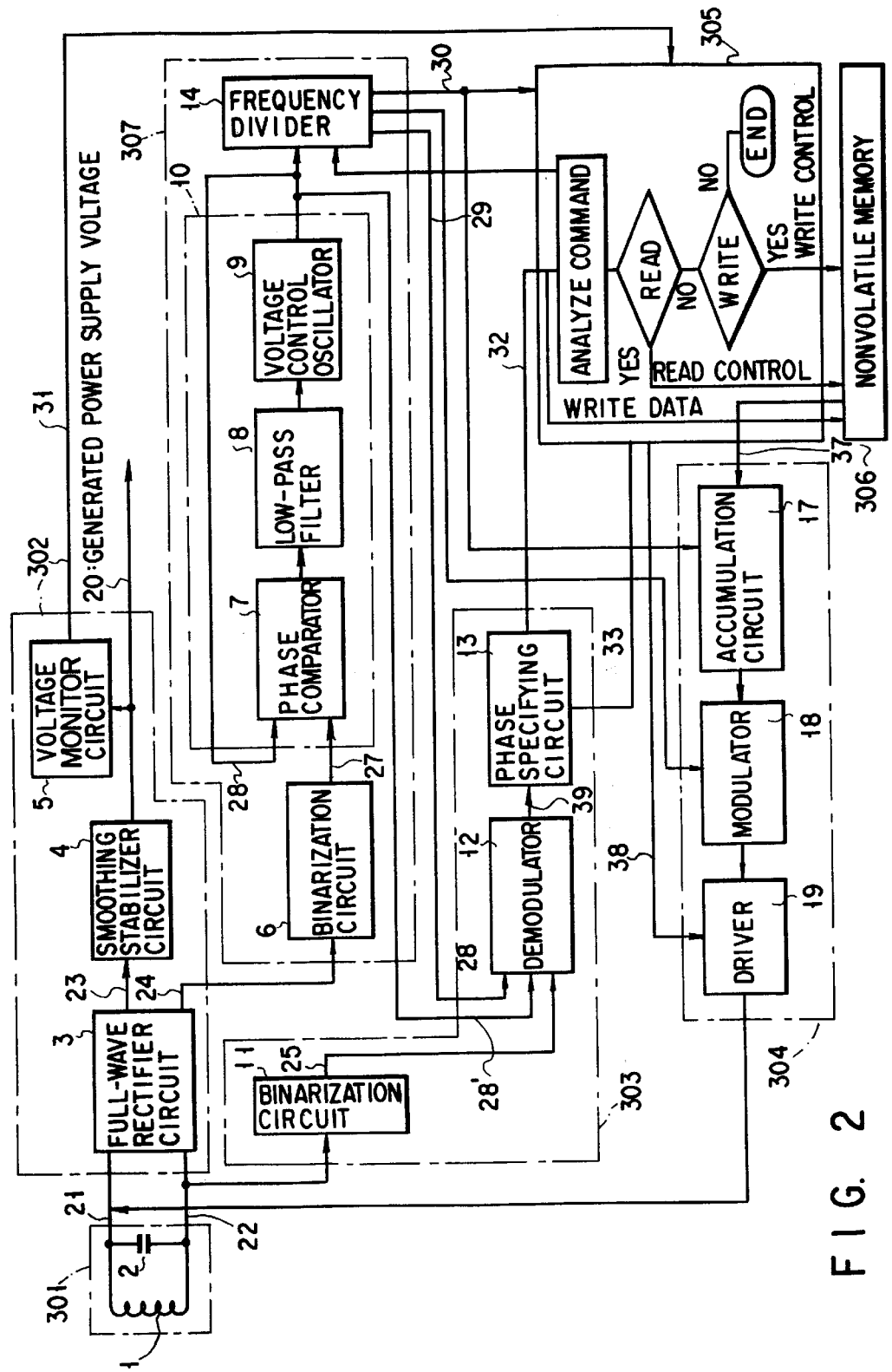
FIG. 2 is a block diagram schematically showing the constitution of a radio card according to an embodiment of the present invention.

The radio card 300 is designed to decode a command transmitted from the radio card reader/writer 200, write (store) data, transmit data, etc. As shown in FIG. 2, radio card 300 includes a parallel tuning circuit (reception means) 301 having both a loop-shaped antenna coil 1 serving as a receiving/transmitting antenna and a tuning capacitor 22, a power supply voltage generation section (power supply voltage generation means) 302, a demodulation circuit (demodulation means) 303, a control logic circuit 305, a modulation circuit (modulation means) 304, a nonvolatile memory 306 constituted of an EEPROM or the like as a memory means, and a clock generation circuit (clock generation means) 307.

The radio card reader/writer 200 and radio card 300 will now be described in detail.

First the reading of data from the radio card 300 will be explained. The control section 207 of the radio card reader/writer 200 generates a readout command and sends it to the modulation circuit 204. The circuit 204 modulates the command by an arbitrary modulation method and transmits a modulated signal to the transmitting driver 203. The driver 203 amplifies the modulated signal so as to have sufficient radiant intensity. The amplified signal is then supplied to the transmitting antenna 201.

The signal supplied to the antenna 201 is emitted toward space and received by the parallel tuning circuit 301 of the radio card 300. The received signal is demodulated by the demodulation circuit 303, and the demodulated signal is supplied to the control logic circuit 305 and its command is analyzed. If the circuit 305 decodes the command as "readout", it reads desired card data from the nonvolatile memory 306, and sends the card data to the modulation circuit 304. The circuit 304 modulates the card data and supplies the modulated data to the parallel tuning circuit 301.

The signal supplied to the circuit 301 is also emitted toward space and received by the receiving antenna 202 of the radio card reader/writer 200. The received signal is sent to the receiving amplifier 205. The amplifier 205 amplifies the signal and sends it to the demodulation circuit 206. The signal is thus demodulated and supplied to the controller 207. The demodulated signal is subjected to predetermined processing. When the need arises, data can be displayed by the display section 208 and data can be input from the operating section 209.

Next the writing of data to the radio card 300 will be explained. The control section 207 of the radio card reader/writer 200 generates a write command and write data and sends them to the modulation circuit 204. The circuit 204 modulates the command and data by an arbitrary modulation method and supplies a modulated signal to the transmitting driver 203. The driver 203 amplifiers the modulated signal so as to have sufficient radiant intensity. The amplified signal is supplied to the transmitting antenna 201.

The signal supplied to the antenna 201 is emitted toward space and received by the parallel tuning circuit 301 of the radio card 300. The received signal is demodulated by the demodulation circuit 303, and the demodulated signal is sent to the control logic circuit 305 and its command is analyzed. If the circuit 305 decodes the command as "write", it writes write data following the write command to a desired address of the nonvolatile memory 306.

The power supply voltage generation section 302 of the radio card 300 generates a power supply voltage to be consumed in the radio card 300 in response to the signal received by the parallel tuning circuit 301.

The clock generation circuit 307 of the radio card 300 is used to generate a clock signal in response to the signal received by the parallel tuning circuit 301. The clock signal is supplied to the demodulation circuit 303, modulation circuit 304 and control logic circuit 305 in order to operate them.

In the radio card reader/writer 200, the transmitting and receiving antennas 201 and 202 have to be located close to each other and opposite to the parallel tuning circuit 301 of the radio card 300. The transmitting antenna 201 transmits a signal with high intensity to the radio card 300. Receiving circuits including the receiving antenna 202 have a high sensitivity since it needs to receive a faint signal from the radio card 300.

The constitution of the radio card 300 will now be described in detail with reference to FIGS. 1 to 4.

The parallel tuning circuit 301, which includes a loop-shaped antenna coil 1 and a tuning capacitor 2, receives a two-phase modulated radio wave signal of carrier frequency f0 (first two-phase modulated radio wave signal) from the transmitting antenna 201 of the radio card reader/writer 200. The circuit 301 also transmits a two-phase modulated radio wave signal of carrier frequency f0/2 (second two-phase modulated radio wave signal) using a transmitting driver 19 (described later). In the parallel tuning circuit 301, the antenna coil 1 transmits a carrier frequency f0/2 at the same time when it receives a carrier frequency f0, and it is necessary to efficiently secure electric power for generating a power supply voltage from received radio wave. The circuit 301 is thus designed so as to be tuned to carrier frequency f0 of a received two-phase modulated radio wave signal, as shown in FIG. 9. The carrier frequency to be transmitted need not be ½ but can be 1/n (n=integer) that of a two-phase modulated radio wave signal to be received.

Upon receiving the two-phase modulated radio wave signal from the parallel tuning circuit 301, the power supply voltage generation section 302 generates a power supply voltage to be applied to all the circuits of the radio card 300. The section 302 includes a full-wave rectifier circuit 3 having first and second full-wave rectifier circuits 3a and 3b for full-wave rectifying the two-phase modulated radio wave signal, a smoothing stabilizer circuit 4 for smoothing a full-wave rectified signal 24 output from the first full-wave rectifier circuit 3a using smoothing capacitors C1 and C2, and a voltage monitor circuit 5 for monitoring a generated power supply voltage 20 output from the smoothing stabilizer circuit 4. The voltage 20 is 3V.

The first full-wave rectifier circuit 3a is constituted of diodes D1 to D4, while the second full-wave rectifier circuit 3b is constituted of D1, D2, D5 and D6. The diodes D1 and D2 are common to the two circuits 3a and 3b. The circuits 3a and 3b are connected to both ends of the parallel tuning circuit 301, and output full-wave rectified signals 23 and 24.

The full-wave rectifier circuits 3a and 3b include two pairs of diode bridges having two common diodes whose anodes are grounded. While an output of the first full-wave rectifier circuit 3a is smoothed and used for generating a power supply voltage, an output of the second full-wave rectifier circuit 3b is used for providing a clock signal.

For the smoothing stabilizer circuit 4, a series regulator or a shunt regulator is employed since the received power greatly varies according to a distance between the radio card 300 and radio card reader/writer 200.

Since a two-phase modulated radio wave signal is used as a received modulated radio wave signal to always receive a carrier wave from the parallel tuning circuit 301 and always generate a power supply voltage, the smoothing capacitors C1 and C2 can be decreased in capacity, with the result that the radio card 300 can be thinned and the rise time of the operation can be shortened.

The generated power supply voltage 20 output from the smoothing stabilizer circuit 4 is monitored by the voltage monitor circuit 5 constituted of a comparator (not shown) and the like. When the voltage 20 becomes a value of 2.7V or higher which sufficiently stably operates the respective circuits in the radio card 300, the circuit 5 supplies "1" to the control logic circuit 305 as an output 31. When the voltage is lower than 2.7V, it supplies "0" thereto as an output 31 based on hysteresis characteristics (caused by a capacitor or the like).

When the control logic circuit 305 receives "1" as the output 31 from the voltage monitor circuit 5, it releases a system clear and then when the circuit does "0", it clears the system. It is thus possible to prevent the control logic circuit 305 from malfunctioning.

Since the load of the first full-wave rectifier circuit 3a is the smoothing capacitor C1, the full-wave rectified signal 23 output therefrom is a direct-current voltage with a ripple as indicated by the solid line in FIG. 10C.

Since the loads of the second full-wave rectifier circuit 3b are resistors R1 and R2 connected in series in a binarization circuit 6, the full-wave rectified signal 24 output therefrom is expressed by the waveform as shown in FIG. 10E. The frequency of the signal 24 is twice as high as that of that voltage received at both ends of the antenna coil 1 which is shown in FIG. 10B, and the signal and the received voltage are synchronized with each other.

Since the forward resistance value of diodes D1, D2, D5 and D6 which are rendered in a conductive state, is considerably lower than the resistance value (R1+R2), the load of the parallel tuning circuit 301 corresponds to the value (R1+R2).

If the tuning frequency is f0, the −3dB bandwidth is ±Δf, and the inductance of antenna coil 1 is L, value Q, which determines the selectivity characteristics of the parallel tuning circuit 301, is expressed as follows:

$$Q = f0/2\Delta f \approx (R1+R2)/(2\pi f0 L)$$

As is apparent from the above equation, the selectivity of the circuit 301 can be determined by the resistance value (R1+R1).

If the frequency bandwidth of the circuit 301 is narrow when the circuit 301 receives a two-phase modulated radio wave signal as a power supply voltage, an envelope of carrier wave f0 greatly varies, as shown in FIG. 10B, in the transition of phases (i.e., points where data "0" and "1" change to each other), as shown in FIG. 10B, which causes a problem in generating a power supply voltage. To correctly receive the two-phase modulated radio wave signal, a predetermined bandwidth has to be secured. This bandwidth can be secured by adjusting the resistance value (R1+R2).

Figure 5:
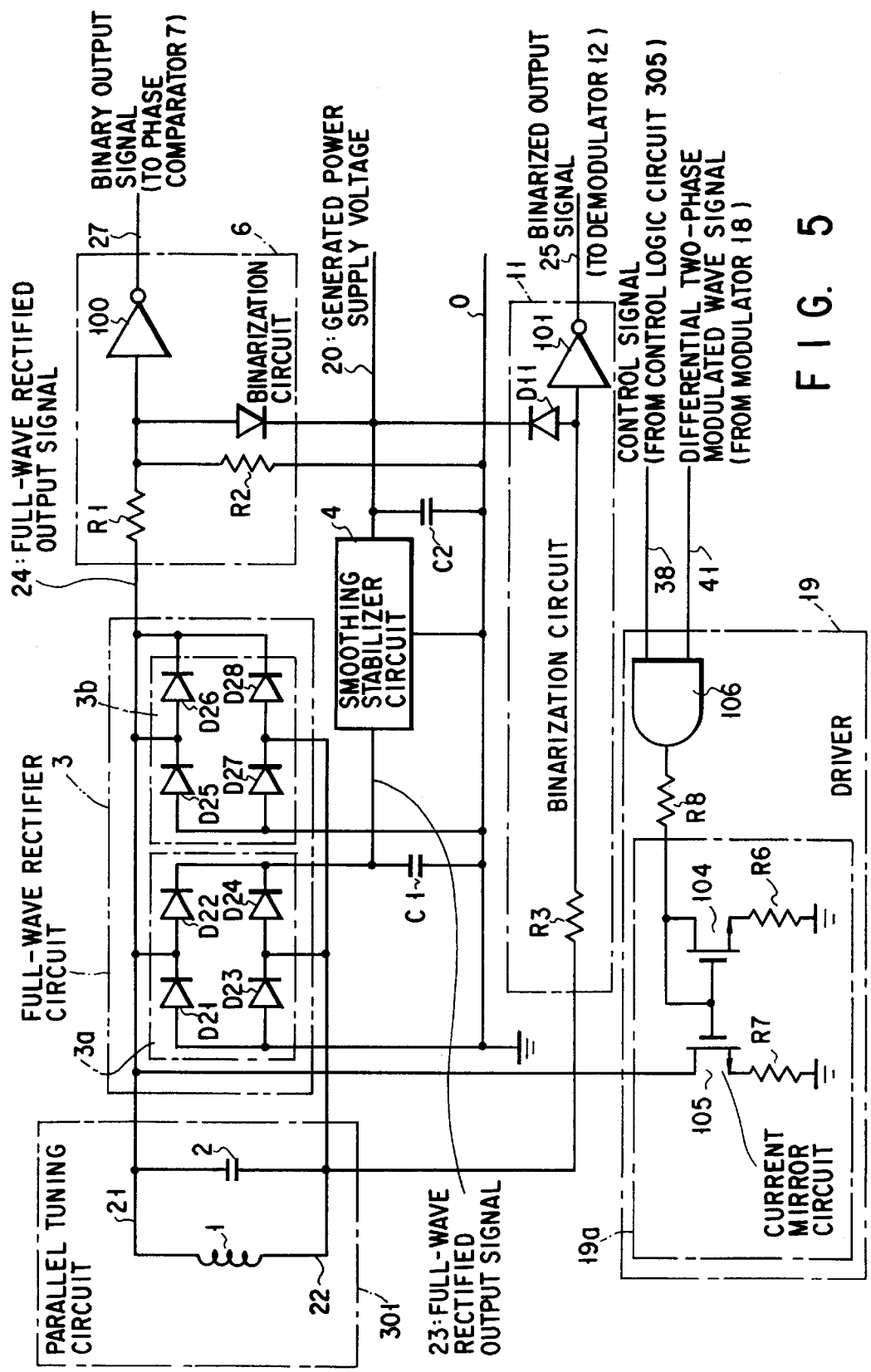
FIG. 5 is an electric circuit diagram schematically showing the constitution of the principal part of the radio card of FIG. 2.

The two full-wave rectifying circuits 3a and 3b are essential to the present invention since their outputs are used for different purposes. They are not limited to the constitution shown in FIG. 3, but can be constituted separately as shown in FIG. 5. In the case of FIG. 5, the separate circuits 3a and 3b are each connected to both ends of the parallel tuning circuit 301 to receive a signal therefrom, and the first full-wave rectifier circuit 3a includes diodes D21 to D24, while the second full-wave rectifier circuit 3b includes diodes D25 to D28.

The demodulation circuit 303 is intended to demodulate the two-phase modulated radio wave signal received by the parallel tuning circuit 301 and, as shown in FIG. 2, includes a binarization circuit 11, a demodulator 12 and an absolute phase specifying circuit 13.

Figure 3:
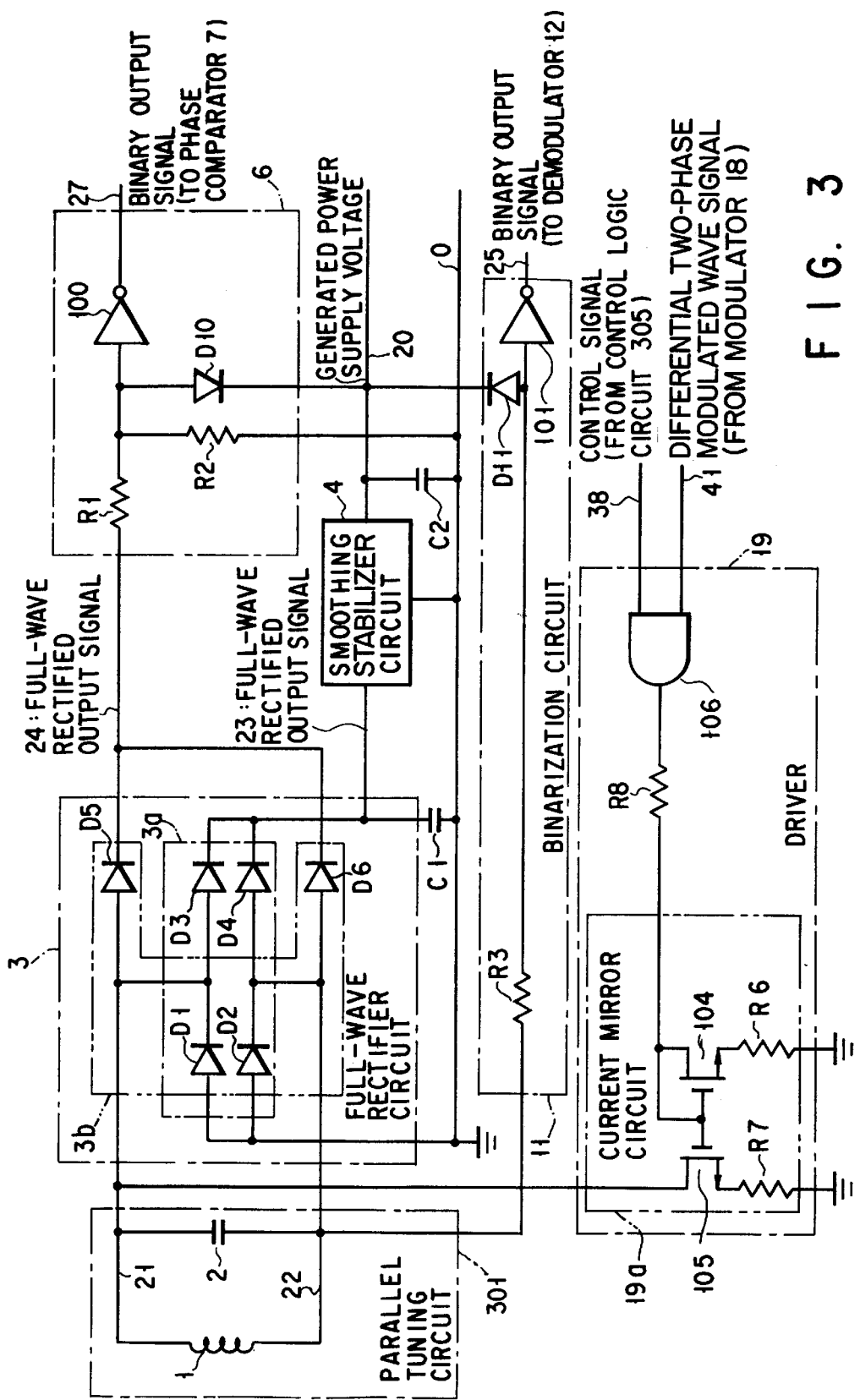
FIG. 3 is an electric circuit diagram schematically showing the constitution of the principal part of the radio card of FIG. 2.

The binarization circuit 11 is designed to binarize the two-phase modulated radio wave signal received by the parallel tuning circuit 301 and, as shown in FIG. 3, includes a resistor R3 whose resistance value is higher than that of each of resistors R1 and R2, a diode D11, and a logic gate (inverter) 101 having a hysteresis function. The input terminal of the logic gate 101 is connected to a voltage terminal 22 of the parallel tuning circuit 301 through the resistor R3 and then to the generated power supply voltage 20 through the diode D11.

The waveform of a two-phase modulated radio wave signal generated between terminals 21 and 22 of the circuit 301 varies 180° in phase, as shown in FIG. 10B, with respect to data bits "0" and "1" shown in FIG. 10A. Since the transmission from the antenna 201 of the radio card reader/writer 200 and the reception by the parallel tuning circuit 301 in the radio card 300 are performed within a limited narrow bandwidth, the waveform cannot be correctly formed but broken or distorted in the transition of phases, as shown in FIG. 10B. According to FIG. 10B, a half wave of the carrier wave is not completely reproduced and its amplitude is diminished immediately after the phase changes.

When the full-wave rectifier circuit 3 is connected to both the terminals 21 and 22 of the parallel tuning circuit 301, the waveform of voltage at the terminal 22 is formed as shown in FIG. 10D if it is observed on the basis of reference (ground) potential 0. This waveform corresponds to a positive half wave with respect to reference potential 0 and its peak value is larger than 3V of the power supply voltage 20.

To generate a smoothly stabilized power supply voltage 20 of 3V generated from the received two-phase modulated radio wave signal, about 6V is required as the peak value of the voltage at the terminal 22. If, however, the distance between the radio card 300 and radio card reader/writer 200 is shortened, the peak value is increased further and, in this case, the amplitude of a signal input to the logic gate 101 is made larger than that of a power supply voltage at the gate 101, with the result that the gate 101 and its subsequent stage will be damaged.

To prevent this damage, when the voltage at the terminal 22 is higher than the 3V power supply voltage 20, the current flows in a direction so that the capacitor C2 is charged through the resistor R3 and diode D11. Thus, the input of the logic gate 101 is clamped, and excess power is returned to the power supply voltage 20, thereby protecting the subsequent stage.

Assume that the resistance value of the resistor R3 is considerably larger than that of each of the resistors R1 and R2 so as not to influence the selectivity characteristics of the parallel tuning circuit 301. Since the logic gate 101 is operated at the 3V power supply voltage, the threshold voltage of the input is approximately 1.5V. The peak value of the voltage at the terminal 22 is 6V or more; thus the two-phase modulated radio wave signal generated at both the terminals 21 and 22 is binarized in the middle of the amplitude of the signal. The waveform of a binary signal 25 output from the logic gate 101 is formed as shown in FIG. 10G. The input voltage of the logic gate 101, which exceeds the power supply voltage, is applied through the resistor R3 and diode D11 in a direction which contributes to the generation of a power supply voltage.

Figure 4:
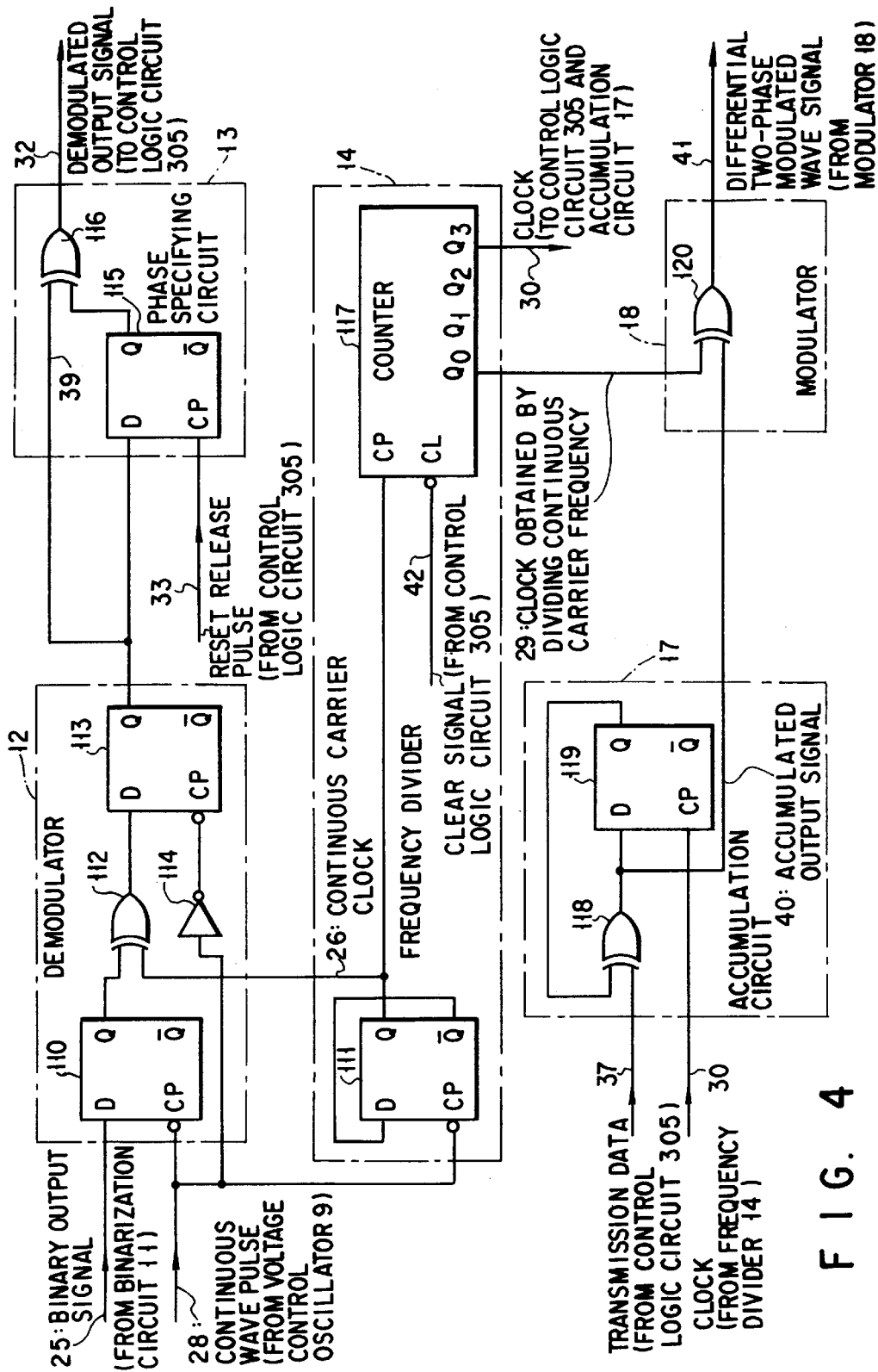
FIG. 4 is an electric circuit diagram schematically showing the constitution of the principal part of the radio card of FIG. 2.

The binary signal 25 output from the logic gate 101 of the binarization circuit 11, is supplied to the demodulator 12. Referring to FIG. 4, the demodulator 12 includes a D-type flip-flop circuits (FF circuits) 110 and 113, an exclusive OR circuit (EX-OR gate) 112 and an inverter circuit 114.

The demodulator 12 is supplied with the binary signal 25 (a binarized output of the two-phase modulated radio wave signal) as shown in FIG. 11B, a continuous wave pulse 28 from a voltage control oscillator 9 in a PLL (Phase Locked Loop) circuit 10 (described later) as shown in FIG. 11C, and a set signal 26 output from an FF circuit 111 in a frequency divider 14 (also described later) as shown in FIG. 11E.

The binary signal 25 is not obtained by correctly binarizing the two-phase modulated radio wave signal at the middle of peak-to-peak value, that is, in the middle of the amplitude shown in FIG. 10B, but by doing it at about 1.5V from reference potential 0 in a waveform 22 as shown in FIG. 10D. For this reason, the duty ratio of pulse of the binary signal 25 is not 50% and thus the pulse is asymmetric.

The binary signal 25 is input to the FF circuit 110 and synchronized at the falling edge of continuous wave pulse 28 having a frequency of 2f0 and a duty 5 ratio of 50% from the voltage control oscillator 9. The pulse output from the FF circuit 110, which is shown in FIG. 11D, is synchronized with the pulse 28.

In the FF circuit 111, the frequency of the continuous wave pulse 28 is divided into halves at the falling edge to obtain a pulse having a frequency of f0 and a duty ratio of 50%. The pulse 26 output from the FF circuit 111 is shown in FIG. 11E.

The output pulse of the FF circuit 110 and the output pulse (continuous carrier clock) 26 of the FF circuit 111 are EXCLUSIVE-ORed by the EX-OR gate 112, thereby to generate a modulated signal as shown in FIG. 11F. Since, however, an inconsistent portion between the pulses is output as "1", whiskers occur at the edges of two input pulses as shown in FIG. 11F.

Except for the loop-shaped antenna coil 1, tuning capacitor 2 and smoothing capacitors C1 and C2, the circuits of the radio card 300 are formed on a single LSI chip. It is thus undesirable to remove the whisker of the demodulated signal by a low-pass filter using both a capacitor and a resistor.

Therefore, the continuous wave pulse 28 having a frequency of 2f0 is inverted by the inverter circuit 114, and the output signal of the EX-OR gate 112 is latched and synchronized again in the FF circuit 113 at a timing edge which is shifted by half pulse from the rise time of the pulse 28. The waveform is sampled halfway between whiskers of the output signal of the EX-OR gate 112 and, as shown in FIG. 11G, a demodulated signal 39 the whisker of which are perfectly removed, can be obtained as an output of the FF circuit 113.

The demodulated signal 39 output from the FF circuit 113 is supplied to the absolute phase specifying circuit 13. As illustrated in FIG. 4, the circuit 13 includes a D-type flip-flop circuit (FF circuit) 115 serving as a latch circuit and an exclusive-OR (EX-OR gate) 116.

Since the absolute phase of data bits "0" and "1" in the demodulated signal output from the demodulator 12 is unclear, it is specified by the absolute phase specifying circuit 13.

The demodulated signal 39 output from the FF circuit 113 of the demodulator 12 is input to the latch circuit 115 to latch a specified location of the signal 39 at predetermined specific timing (described later). If the demodulated signal 39 and Q signal (set signal) output from the latch circuit 115 are EXCLUSIVE-ORed by the EX-OR gate 116, a demodulated signal 32 having an absolute phase can be generated from the absolute phase specifying circuit 13. The signal 32 is then supplied to the control logic circuit 305.

The above-described operations are shown in FIGS. 11G, 11H, 11I and 11J. In this embodiment, the data bit from the radio card reader/writer 200 is determined as "0" at the specified location.

If the data bit is determined as "1" at the specified location, the absolute phase can be specified by EXCLUSIVE-ORing the $\overline{Q}$ signal (reset signal) output from the latch circuit 115 and the demodulated signal 39.

In the embodiment described above, the preset specified timing is defined as a rise of a reset release pulse 33 output from the voltage monitor circuit 5. Since the demodulator 12 and absolute phase specifying circuit 13 are constituted of only a few logic circuits, the circuits in the radio card 300 can easily be integrated.

Figure 6:
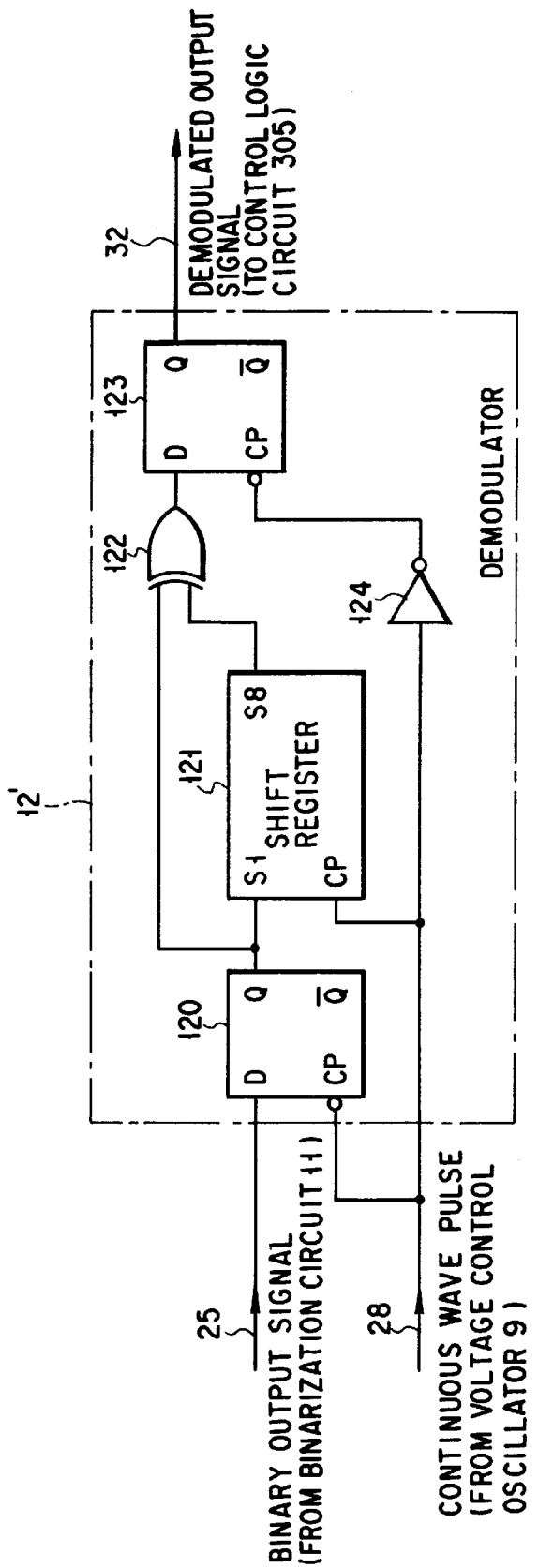
FIG. 6 is an electric circuit diagram schematically showing the constitution of a demodulation circuit of a radio card according to another embodiment of the present invention.

FIG. 6 is a view of another embodiment of the demodulation circuit. A demodulation circuit 12' according to this embodiment, which is constituted only of a logic circuit, demodulates a differential two-phase modulated radio wave signal of two-phase modulated radio wave signals and is suitable for integrating the circuits in the radio card 300.

The differential two-phase modulated radio wave signal can be demodulated by delaying the signal by one data bit and then detecting the phase thereof. In the embodiment shown in FIG. 6, a binary signal 25 output from a logic gate 101 is latched by an FF circuit 120 using continuous wave pulse 28 having a frequency of 2f0 generated from the PLL circuit 10. A sync signal, which is output from the FF circuit 120 as a latch signal, is supplied to a shift register 121. By EXCLUSIVE-ORing the output signal of the shift register 121 and the sync signal using an EX-OR gate 122, a demodulated signal 32 is produced.

The above signal can be demodulated if the number of shifts of the shift register 121 is set twice as large as the wave number of carrier frequency f0 for one data bit. The same whiskers as shown in FIG. 11F occur in the demodulated signal output from the EX-OR gate 122. If the signal is latched again by a latch circuit 123 at the timing shifted by half of the pulse 28 using an inverter circuit 124, a demodulated signal 32 the whiskers of which are completely removed can be obtained. Since the absolute phase of the demodulated signal 32 is specified by demodulating the differential two-phase modulated radio wave signal, the absolute phase specifying circuit 13 as shown in FIG. 4 is not needed in this embodiment.

The foregoing clock generation circuit 307 includes binarization circuit 6, PLL circuit 10, and frequency divider 14, as shown in FIG. 2. The binarization circuit 6 has resistors R1 and R2, a diode D10, and a logic gate 100, as shown in FIG. 3.

The voltage of full-wave rectified signal 24 of the second full-wave rectifier circuit 3b is divided by the resistors R1 and R2, and the waveforms whose amplitudes are narrowed as shown in FIGS. 10E and 10F are input to the logic gate 100. If the resistance values of resistors R1 and R2 are the same, the waveform whose amplitude is half of that of the full-wave rectified signal 24 output from the second full-wave rectifier circuit 3b is input to the logic gate 100, and the signal is binarized at the threshold voltage of about 1.5V which is half the power supply voltage of 3V. In this case, the waveform of output 27 of the logic gate 100 is formed as shown in FIG. 10H.

By binarizing the divided voltage of the full-wave rectified signal 24, the fall of binary signal 27 output from the logic gate 100 can be set always later than that of binary signal 25 output from the logic gate 101 (indicated by "a" in FIG. 10H). This delay in timing ensures an operation of the demodulator 12. The binary signal 27 is supplied to the PLL circuit 10.

Referring to FIG. 2, the PLL circuit 10 includes phase comparator 7, low-pass filter 8 and voltage control oscillator 9. The binary signal 27, which is a pulse having frequency 2f0 which is twice as high as carrier frequency f0 of the received two-phase modulated radio wave signal, cannot be used as it is as a clock for synchronous detection or data processing since, as shown in FIGS. 10A and 10H, a pulse is missing in the transition of data bits "0" and "1", that is, where the phase of the two-phase modulated wave signal changes 180°.

The continuous wave pulse 28, which is synchronized with the binary signal 27 in the PLL circuit 10, is generated from the voltage control oscillator 9, in other words, the phases of pulses 27 and 28 are compared with each other by the phase comparator 7 at the fall timing. The output of the phase comparator 7 is converted to a direct voltage in the low-pass filter 8, and the frequency and phase of the continuous wave pulse 28 are controlled by the direct voltage, with the result that, as shown in FIG. 10I, the phase of pulse 28 is synchronized with that of pulse 27 at the fall timing and the frequency thereof is equal to that of pulse 27. The continuous wave pulse 28 is therefore free of any missing part.

Consequently, the response frequency characteristics of a receiving loop is lower than the frequency of data bits "1" and "0" and, even when a pulse is missing in the transition of data bits, a stably continuous pulse can be generated. However, the first synchronization in the PLL circuit is performed when a signal of carrier frequency f0 is received for a predetermined period of time prior to reception of data of bits "1" and "0".

The continuous wave pulse 28 is supplied from the voltage control oscillator 9 to the phase comparator 7, frequency divider 14 and demodulator 12. The frequency divider 14 includes a D-type flip-flop circuit (FF circuit) 111 and a counter 117, as illustrated in FIG. 4.

The demodulated signal 32 output from the latch circuit 32 of the phase specifying circuit 13 or the demodulated signal 32 output from the demodulator 12' is not correct in the length of one bit since the transition of data bits "1" and "0" is indefinite. The reason is as follows. Since data is transmitted from the radio card reader/writer 200 to the radio card 300 through a limited transmission path with a narrow bandwidth, the received two-phase modulated radio wave signal is not correct in the transition of phases, as shown in FIG. 10B, where an error in demodulation occurs.

The frequency divider 14 for generating a clock 30, used for outputting a demodulation signal 32 from the circuit 13 (or demodulator 12') as re-synchronized data which is correctly demodulated in one bit, will now be described with reference to FIG. 4. The divider 14 includes FF circuit 111 for dividing frequency 2f0 of the continuous wave pulse 28 into two and 4-bit counter 117 for receiving a pulse of frequency f0 (continuous carrier clock: set signal 26) from the FF circuit 111 and dividing it into sixteen.

Data bit "0" continues for a while from the beginning of data transmission from the radio card reader/writer 200, as shown in FIG. 12A, to generate a power supply voltage. If a starting bit "1" (causing a predetermined polarity change) for starting the operations of control logic circuit 305 and nonvolatile memory 306 is demodulated after a sufficient period of time (about several milliseconds) required for locking the PLL circuit 10, the counter 117 receives a clear signal 42 at the rise timing of the starting bit "1" as shown in FIG. 12C, and the clear is released and the frequency division is started.

Consequently, as shown in FIGS. 12D and 12E, the demodulated signal 32 is synchronized at the rise timing of Q3 signal 30 output from the counter 117, and data can be written correctly to the nonvolatile memory 306. In this embodiment, however, the number of carrier waves per data bit is sixteen.

The Q3 signal 30 (generated by dividing the output of the FF circuit 111 into sixteen) is supplied to an accumulation circuit 17 of the demodulation circuit 304 and the control logic circuit 305. A Q0 signal 29 output from the counter 117 (by dividing the set signal 26 output from the FF circuit 111 by four) is supplied to a modulator 18 of the modulation circuit 304. As illustrated in FIG. 2, the modulation circuit 304 includes accumulation circuit 17, modulator 18, and driver 19.

An embodiment for transmitting a two-phase modulated signal of data bit (transmission data) 37 read out from the nonvolatile memory 306 will now be described.

Upon receiving a command and an address, the radio card 300 reads data out of an address of the memory 306 and modulates and transmits it as transmission data 37. It is undesirable to add redundant data to the front of data 37 in order to obtain a quick response. It is thus desirable to output the demodulated data from the radio card 300 as an absolute phase.

An example of the constitution of the accumulation circuit 17 for adding the absolute phase is shown in FIG. 4. The accumulation circuit 17 includes an exclusive-OR circuit (EX-OR gate) 118 and a D-type flip-flop circuit (FF circuit) 119. The modulator 18 includes an EX-OR gate 120.

With this constitution, as the Q3 signal as a data clock, the transmission data 37 can be accumulated using both EX-OR gate 118 and FF circuit 119. In this accumulation, the present transmission data 37 and its one-clock preceding transmission data are added (disregarding a carry), and an output signal 40 of the accumulation circuit 17 and a Q0 signal of the counter 117, i.e., a pulse of frequency f0/2 are EXCLUSIVE-ORed by the EX-OR gate 120, thereby generating a differential two-phase modulated radio wave signal 41. The signal 41 is then supplied to the driver 19 as a transmission signal.

As shown in FIG. 3, the transmitting driver 19 is used to drive the parallel tuning circuit 301 in response to the differential two-phase modulated radio wave signal 41 and constituted of a current mirror circuit 19a having resistors R6 and R7 and MOS transistors 104 and 105, an AND gate 106, and a resistor R8. The AND gate 106 is supplied with the signal 41 and the control signal 38 which becomes "0" in the write mode of the nonvolatile memory 306. The resistance value of the resistor R7 is higher than that of the resistor R6.

An operation of the driver 19 will be explained with reference to FIGS. 13A and 13B. FIG. 13B shows an output of the MOS transistor (driver) 105 of the current mirror circuit 19a, that is, a pulse carrier wave with frequency f0/2. The output of the MOS transistor 105 is connected to a terminal 21 of the parallel tuning circuit 301. A reception voltage of carrier wave f0 (indicated by solid line in FIG. 13A) is generated from the loop-shaped antenna coil 1 of the circuit 301. Those portions of positive waveforms of the carrier wave f0 which cause electromotive force, are alternately absorbed by a fixed amount of current determined by the current mirror circuit 19a.

The variations in the current (indicated by dotted line in FIG. 13A) can be sent out as a radio wave transmitted from the radio card 300. Since, in this embodiment, the resistance value of resistor R6 is equal to about ten times as large as that of resistor R7, the mirror current ratio is increased several tens of times and thus the current consumption of the MOS transistor can be reduced sufficiently.

In the write mode of the nonvolatile memory 306, the output signal of the AND gate 106 becomes "0" and the driver 105 can be rendered nonconductive. In this mode, therefore, the driver 105 does not function as a load of the parallel tuning circuit 301 and thus data can be received efficiently. In other words, in the write mode of the memory 306, the power consumed by the driver can be suppressed and a considerably large amount of power can be secured.

As described above, since the phase of the signal transmitted from the parallel tuning circuit 301 is the absolute one, the radio card reader/writer 200 is able to receive it without determining the phase of the signal.

Figure 7:
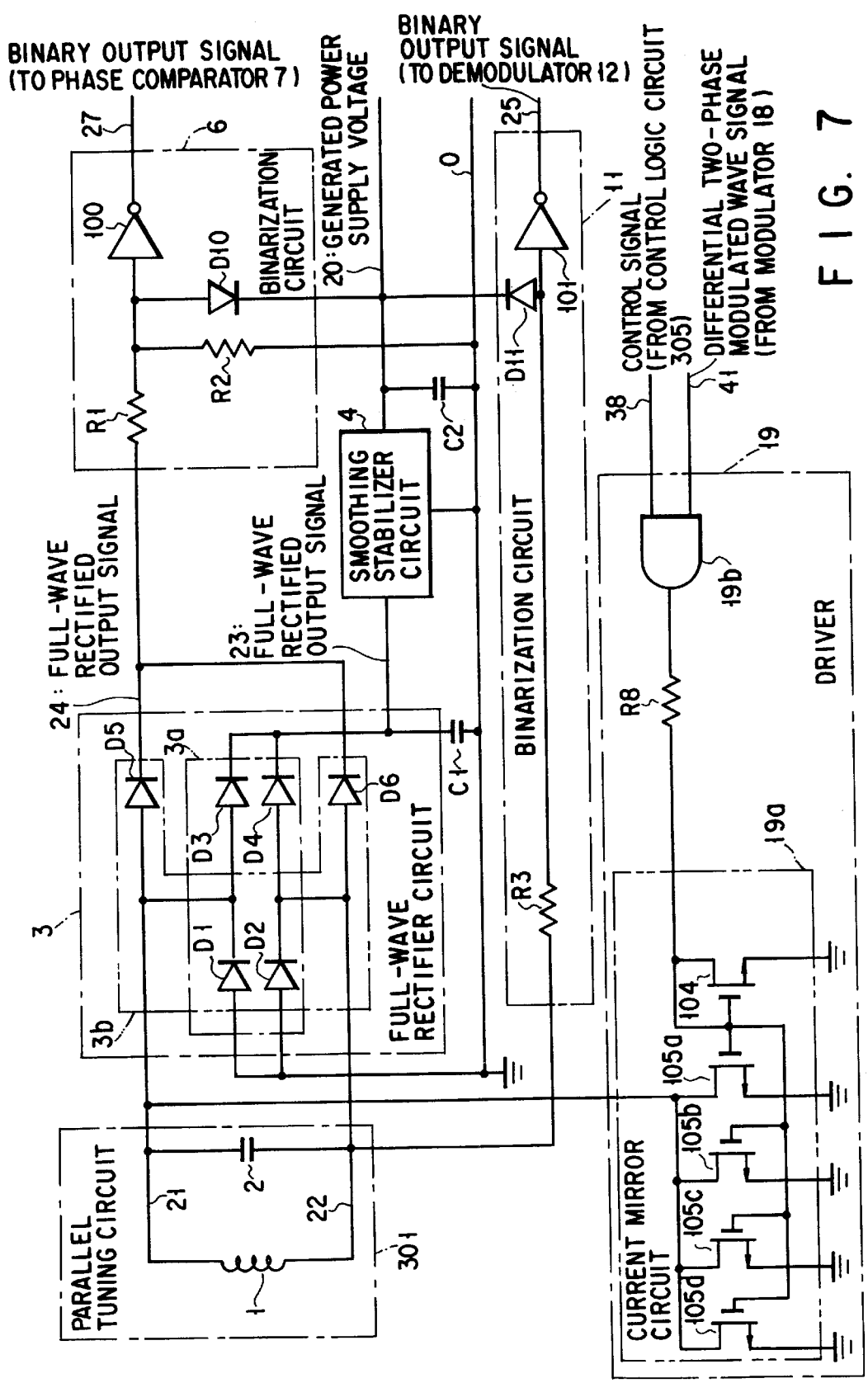
FIG. 7 is an electric circuit diagram schematically showing the constitution of the principal part of the radio card of FIG. 6.

FIG. 7 shows another embodiment of the current mirror circuit 19a of the transmitting driver 19. In this embodiment, four MOS transistors 105a to 105d receive current necessary for signal transmission. These MOS transistors constitute the current mirror circuit, and their gates, drains, and sources are connected in common. In the embodiment shown in FIG. 7, the fourfold mirror current ratio is obtained and can be increased further when the need arises. Therefore, the current flowing through the MOS transistor 104 can be reduced, with the result that the value of the resistor R8 can be increased and the current consumption of a generated power supply voltage of 3V.

Figure 8:
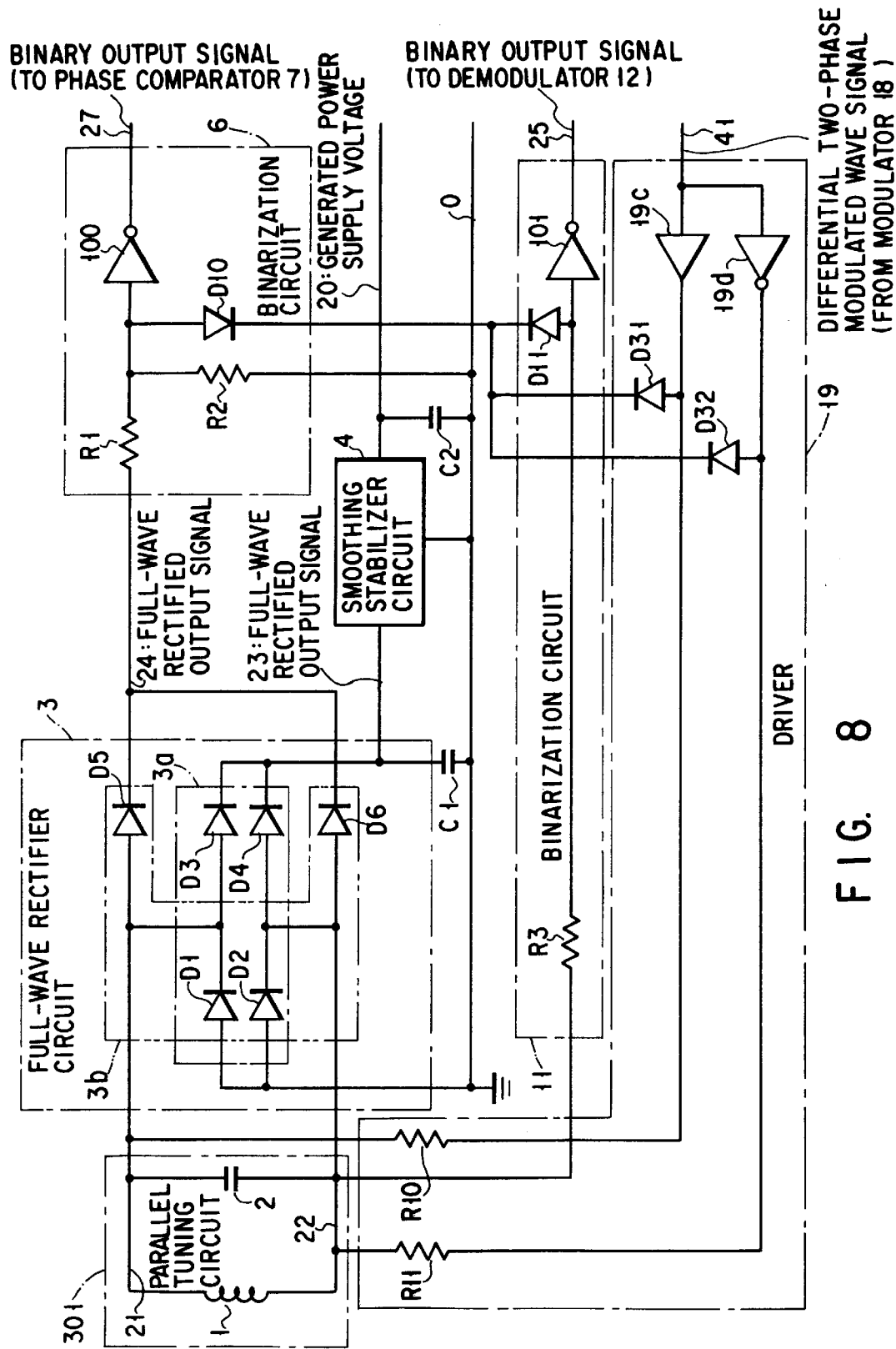
FIG. 8 is an electric circuit diagram schematically showing the constitution of the principal part of the radio card of FIG. 6.

FIG. 8 is a circuit diagram depicting another embodiment of the transmitting driver 19, and FIGS. 13C, 13D and 13E are views of waveforms showing an operation of the driver. In this embodiment, a differential two-phase modulated radio wave signal 41 is input to logic gates 19c and 19d. These logic gates are of inverting and noninverting types and perform a push-pull operation. Since the output impedance of the logic gates 19c and 19d is low, they serve as voltage drivers. The output voltages of the logic gates are approximately 0V and 3V, respectively since a power supply voltage of 3V is applied thereto. The waveforms of the output voltages are shown in FIGS. 13D and 13E, respectively, and the frequency of the modulated carrier wave is f0/2.

The logic gate 19c is connected to the terminal 21 of the parallel tuning circuit 301 (loop-shaped antenna coil 1) via a resistor R10. The current flowing through the circuit 301 is supplied from its terminal 21 into the output of the logic gate 19d through a resistor R11. Thus, a loop of drive current is formed to transmit a signal. Since, as indicated by solid line of FIG. 13C, the parallel tuning circuit 301 receives a carrier wave signal from the card reader/writer 200 even in the transmission mode, if the current is driven for signal transmission, the operation as denoted by arrows in FIG. 13C are carried out. As a result, the transmission current flows as indicated by dotted line of FIG. 13C, and the differential two-phase modulated radio wave signal having frequency f0/2 can be transmitted.

Since the logic gates 19c and 19d perform a push-pull operation and serve as a voltage driver, the amount of transmission current and the selectivity characteristic of the parallel tuning circuit can be determined by the resistance values of resistors R10 and R11.

When a voltage which is higher than the generated power supply voltage of 3V is received, the current flows through the resistor R10 and diode D31 and through the resistor R11 and diode D32 in a direction so that the capacitor C2 is charged in order to protect the logic gates 19c and 19d from the high received voltage. Consequently, the logic gates 19c and 19d are protected by clamping the outputs thereof.

The transfer of data between the radio card 300 and radio card reader/writer 200 arranged closer to each other, will now be described with reference to the timing charts shown in FIGS. 14A and 14B.

By causing the radio card 300 to approach the reader/writer 200, the card 300 receives a two-phase modulated radio wave signal from the reader/writer 200. If a power supply voltage generated from the signal exceeds a predetermined value, the power supply of the radio card 300 is turned on. After that, the card 300 receives and analyzes a (read or write) command of the two-phase modulated radio wave signal from the radio card reader/writer 200. In the write mode, the radio card 300 receives write data subsequent to the above command and writes it to a nonvolatile memory 506. In the read mode, the radio card 300 receives an address or the like subsequent to the above command, reads out data corresponding thereto from the memory 506, and transmits it to the radio card reader/writer 200.

As described above, according to the present invention, the data or command transmitted from the radio card reader/writer 200 is employed for power supply in the radio card 300 and can be received or transmitted continuously. After that, if the radio card 300 is moved away from the radio card reader/writer 200, a power supply voltage generated in response to the two-phase modulated radio wave signal from the reader/writer 200 becomes lower than a predetermined value, and the power supply of the radio card 300 is turned off.

In the radio card having no battery according to the present invention, since the reception of commands and the read/write operations of data can be performed continuously, the reception of power or the reception/transmission of data need not be performed intermittently, and a large amount of data can be received or transmitted quickly and continuously.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data storage medium without a battery, comprising:
reception means for receiving a two-phase modulated radio wave signal;
first and second full-wave rectifying means for full-wave-rectifying the two-phase modulated radio wave signal received by said reception means;
power supply voltage generation means for generating a power supply voltage from an output voltage of said first full-wave rectifying means;
first binarization means for binarizing an output voltage of said second full-wave rectifying means;
clock signal generation means for generating a continuous clock signal in response to a binary signal output from said first binarization means;
second binarization means for binarizing the two-phase modulated radio wave signal received by said reception means; and
demodulation means for demodulating a binary signal output from said second binarization means, using the continuous clock signal generated by said clock signal generation means.

2. The data storage medium according to claim 1, wherein said reception means includes a parallel tuning circuit having a loop-shaped antenna and a capacitor; said first binarization means include a resistor for dividing the output voltage of said second full-wave rectifying means and a logic gate having a hysteresis function for binarizing a divided voltage; said clock signal generation means includes PLL means for receiving an output of said logic gate and generating a continuous clock signal synchronized with the binary signal output from said second binarization means; and said demodulation means demodulates the binary signal from said second binarization means when a two-phase modulated radio wave signal received by said loop-shaped antenna is stable.

3. The data storage medium according to claim 2, wherein said first and second full-wave rectifying means include diode bridges connected to both ends of said parallel tuning circuit, and said diode bridges are constituted of two pairs of diode bridges having two diodes in common.

4. The data storage medium according to claim 1, further comprising:
first synchronizing means for synchronizing the binary signal output from said second binarization means with the continuous clock signal generated by said clock signal generation means, using one edge of the continuous clock signal;
frequency dividing means for frequency-dividing the continuous clock signal generated by said clock signal generation means;
exclusive-OR means for outputting an exclusive-OR signal generated from a first sync signal output from said first synchronizing means and a frequency-divided signal output from said frequency dividing means; and
second synchronizing means for synchronizing the exclusive-OR signal output from said exclusive-OR means with the continuous clock signal generated by said clock signal generation means, using another edge of the continuous clock signal, said second synchronizing means outputting a second sync signal as a demodulated signal.

5. The data storage medium according to claim 1, further comprising specifying means for specifying a phase of a demodulated signal output from said de-modulation means at predetermined timing.

6. The data storage medium according to claim 1, further comprising:
   first output means for outputting a continuous clock signal synchronized with the output voltage of said second full-wave rectifying means;
   first synchronizing means for synchronizing the binary signal output from said second binarization means with the continuous clock signal output from said first output means, using one edge of the continuous clock signal output from said first output means;
   shift means for shifting a sync signal output from said first synchronizing means by time corresponding to a wave number which is twice as large as that of one data bit length of the two-phase modulated radio wave signal received by said reception means; and
   second output means for outputting an exclusive-OR signal generated from a signal output from said shift means and a first sync signal output from said first synchronizing means;
   second synchronizing means for synchronizing the exclusive-OR signal output from said second output means with the continuous clock signal output from said first output means, using another edge of the continuous clock signal output from said first output means, said second synchronizing means outputting a second sync signal as a demodulated signal.

7. The data storage medium according to claim 1, wherein said reception means includes a parallel tuning circuit for receiving the two-phase modulated radio wave signal having a predetermined frequency, said first and second full-wave rectifying means full-wave-rectify the two-phase modulated radio wave signal received by said parallel tuning circuit, and said data storage medium further comprises:
   a nonvolatile memory for storing data;
   control means for discriminating a command indicative of storage of readout and stored data in response to a demodulated signal and for, when a command indicative of storage is demodulated by said demodulation means, storing stored data demodulated by said demodulation means in said nonvolatile memory and, when a command indicative of readout is demodulated by said demodulation means, reading data out of said nonvolatile memory;
   modulation means for modulating the data read out of said control means using a clock signal generated by frequency-dividing the continuous clock signal generated by said clock signal generation means; and
   transmission means for transmitting a modulated signal output from said modulation means and super-imposed upon the two-phase modulated radio wave signal received by said parallel tuning circuit, at a frequency which is 1/n (n=an integer) as high as the predetermined frequency of the two-phase modulated radio wave signal received by said reception means.

8. A data storage medium with a memory for storing data without a battery, comprising:
   reception means for receiving a first two-phase modulated radio wave signal having a predetermined frequency;
   power supply voltage generation means for generating a power supply voltage from the first two-phase modulated radio wave signal received by said reception means;
   clock signal generation means for generating a continuous clock signal from the first two-phase modulated radio wave signal received by said reception means;
   modulation means for modulating data read out of the memory using a second clock signal generated by frequency-dividing the continuous clock signal generated by said clock signal generation means; and
   transmission means for transmitting a second two-phase modulated radio wave signal which corresponds to the data modulated by said modulation means and is super-imposed upon the first two-phase modulated radio wave signal received by said reception means, said second two-phase modulated radio wave signal having a frequency which is 1/n (n=an integer) as high as the predetermined frequency of the first two-phase modulated radio wave signal received by said reception means.

9. The data storage medium according to claim 8, further comprising:
   demodulation means for demodulating the first two-phase modulated radio wave signal received by said reception means using the continuous clock signal generated by said clock signal generation means; and
   memory means for storing data demodulated by said demodulation means in the memory.

10. The data storage means according to claim 8, wherein said reception means includes a parallel tuning circuit having a loop-shaped antenna whose tuning frequency is equal to the frequency of the first two-phase modulated radio wave signal, and a capacitor, said power supply voltage generation means generates a power supply voltage from the first two-phase modulated radio wave signal received by said parallel tuning circuit, and said data storage medium further comprises:
   demodulation means for demodulating the first two-phase modulated radio wave signal received by said parallel tuning circuit using the continuous clock signal generated by said clock signal generation means; and
   memory means for storing data demodulated by said demodulation means in the memory.

11. A data storage medium comprising:
   reception means for receiving a modulated radio wave signal having a predetermined frequency;
   power supply voltage generation means for generating a power supply voltage from the modulated radio wave signal received by said reception means;
   clock signal generation means for generating a continuous first clock signal from the modulated radio wave signal received by said reception means;
   demodulation means operated by the power supply voltage generated by said power supply voltage generation means, for demodulating the modulated radio wave signal received by said reception means using the continuous first clock signal generated by said clock signal generation means;
   a nonvolatile memory for nonvolatilely storing data demodulated by said demodulation means;
   modulation means for modulating data read out from said nonvolatile memory, using a second clock signal generated by frequency-dividing the continuous first clock signal generated by said clock signal generation means; and transmission means connected to said reception means for transmitting a variation in current as a return radio wave in accordance with the data modulated by said modulation means, said variation being caused by causing a current source to absorb carrier electromotive force induced in said reception means at a frequency which is $1/n$ (n=an integer) as high as the predetermined frequency of said modulated radio wave signal.

12. The data storage means according to claim 11, further comprising means for inhibiting the current source from operating when said nonvolatile memory stores data.

13. A data storage medium comprising:

a parallel tuning circuit having a loop-shaped antenna coil and a capacitor and receiving a two-phase modulated radio wave signal having a predetermined frequency;

power supply voltage generation means for generating a power supply voltage from the two-phase modulated radio wave signal received by said parallel tuning circuit;

clock signal generation means for generating a continuous first clock signal from the two-phase modulated radio wave signal received by said parallel tuning circuit;

demodulation means operated by the power supply voltage generated by said power supply voltage generation means, for demodulating the two-phase modulated radio wave signal received by said parallel tuning circuit using the continuous first clock signal generated by said clock signal generation means;

a nonvolatile memory for nonvolatilely storing data demodulated by said demodulation means;

modulation means for modulating data read out from said nonvolatile memory, using a second clock signal generated by frequency-dividing the first continuous clock signal generated by said clock signal generation means; and transmission means for transmitting a variation in current as a return radio wave, said transmission means having two logic gates which have outputs connected to both ends of said parallel tuning circuit and performing a push-pull operation in accordance with the data modulated by said modulation means so as to absorb a carrier electromotive force, said variation being caused when the carrier electromotive force induced in said parallel tuning circuit is absorbed by said two logic gates at a frequency which is $1/n$ (n=an integer) as high as the predetermined frequency of the two-phase modulated radio wave signal received by said parallel tuning circuit.

* * * * *